Dec. 12, 1967 — W. B. SNIDER — 3,357,258
STATIC WHEEL BALANCER
Filed May 6, 1965
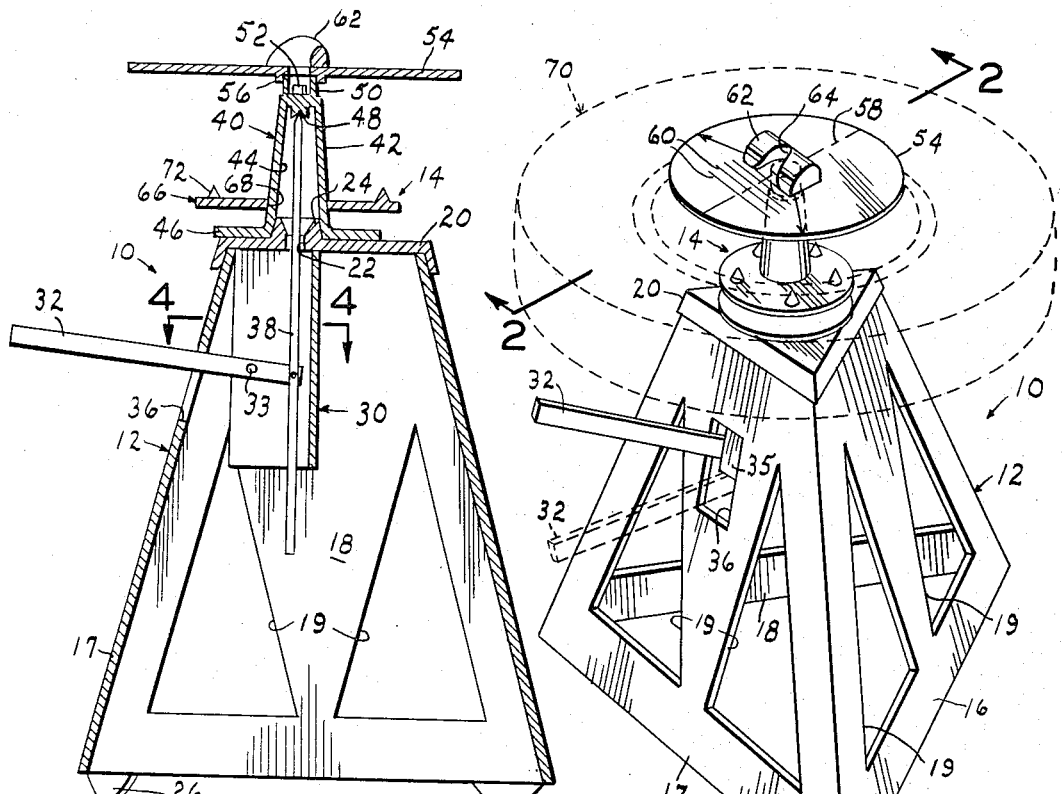
FIG. 1
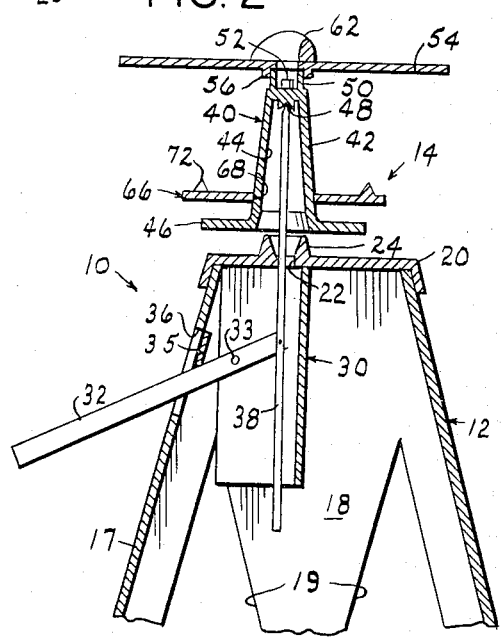
FIG. 2
FIG. 3
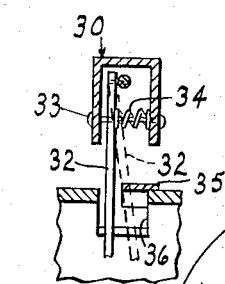
FIG. 4
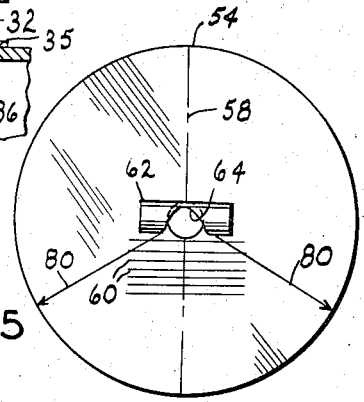
FIG. 5
INVENTOR.
WILLIAM B. SNIDER
BY
*Robert K. Rhea*
AGENT United States Patent Office 3,357,258
Patented Dec. 12, 1967

3,357,258
STATIC WHEEL BALANCER
William B. Snider, P.O. Box 5658,
Midwest City, Okla. 73110
Filed May 6, 1965, Ser. No. 453,724
1 Claim. (73—483)

ABSTRACT OF THE DISCLOSURE

A triangular-shaped upwardly converging stand supports a lever actuated vertically movable shaft which projects above the stand. A truncated cone-shaped column is pendulously supported by the shaft. A wheel supporting lug bolt hole engaging plate is removably received by the tapered column wall. A disk coaxially overlies the column and is provided with a center line and weight indicating scales on its upper surface. A semicylindrical weight indicator is slidably positioned on the upper surface of the disk transversely of the center line and parallel with the weight indicating scales.

---

The present invention relates to wheel balancers and more particularly to a static wheel balancer.

The principal object of the present invention is to provide a static wheel balancer having means in the form of a movable weight slidably mounted on an indicator plate for visually indicating the total weight necessary to be added to the wheel to achieve a static balance of the latter.

Another object is to provide a device of this class which includes a triangular-shaped base or stand eliminating the necessity of a level supporting surface for the wheel balancer.

Another object is to provide a static wheel balancer wherein a wheel supporting flange centers the wheel to be balanced around a vertically movable support column.

Still another object is to provide a device of this class having a wheel supporting shaft poistioned therein and movable vertically by handle means releasably lockable with the stand for elevating the wheel into balancing position.

Still another object is to provide a wheel balancer of sturdy construction which will not easily get out of working order.

The present invention accomplishes these and other objects by providing a support stand housing a vertically movable shaft and providing a wheel support column which surrounds and is centrally supported by the upper end of the shaft. Wheel weight indicating means is removably mounted on the upper end of the wheel support column.

Other objects will be apparent from the following description when taken in conjunction with the accompanying single sheet of drawings, wherein:

FIGURE 1 is a perspective view of the device illustrating, by dotted lines, the relative position of a wheel to be balanced when positioned thereon;

FIGURE 2 is a vertical cross-sectional view taken substantially along the line 2—2 of FIG. 1;

FIGURE 3 is a fragmentary vertical cross-sectional view similar to FIG. 1 with the wheel supporting shaft in elevated position;

FIGURE 4 is a fragmentary horizontal cross-sectional view taken substantially along the line 4—4 of FIG. 2;

FIGURE 5 is a top plan view of the wheel weight indicator.

Like characters of reference designate like parts in those figures of the drawings in which they occur.

In the drawings:

The reference numeral 10 indicates the device, as a whole, comprising a triangular shaped stand 12 having wheel supporting means 14 mounted thereon. The stand or base 12 is preferably formed by a one piece casting having side members 16, 17 and 18, each truncated triangular in side elevation and provided with lightening holes 19. A horizontally disposed triangular cap or cover 20 overlies the upper end portion of the stand. The cap 20 is provided with a central aperture 22 defined by an upstanding truncated conical shaped boss 24. Foot members 26, formed on the depending edge surface adjacent the juncture of the respective side members of the stand, support the latter in spaced relation with respect to a common support surface, indicated by the line 28.

A channel-like housing 30 is connected in depending relation to the lower surface of the cap 20 around the opening 22. The housing 30 is open at its bottom end and one side is open toward the stand side member 17. A strap metal handle 32 is pivotally mounted for vertical movement between the walls of the housing 30 by a pin 33. One end portion of the handle 32 projects outwardly through the side member 17 of the stand through an opening 36. A spring 34 surrounding the pin 33 normally maintains the handle 32 against one side of the housing 30. A lip 35, projecting across a portion of the upper end portion of the opening 36, forms a lock for the handle for the reasons presently explained. The other end portion of the handle 32 is pivotally connected to a shaft 38 extending vertically through the housing 30 and cap opening 22. The shaft 38 projects upwardly above the cap 20 a selected distance and is provided with a pointed upper end.

A wheel supporting column 40 surrounds the upwardly disposed end portion of the shaft 38. The column 40 is characterized by an inclined or upwardly tapering wall 42 having an inner surface 44 cooperatively contacting, at its depending end portion, the outer surface of the conical-shaped boss 24. The wall 42 of the column 40 is turned outwardly at its depending end to form a horizontal flange 46 which flatly contacts the upper surface of the cap 20 when the shaft 38 is in a lowered position. The handle 32, contacting the upper limit of the opening 36, forms a stop and limits downward movement of the shaft 38. The upper end of the column 40 is closed and provided with a downwardly opening conical recess 48 which contacts, in column supporting relation, the upper pointed end of the shaft 38. An annular flange 50 is formed on and projects upwardly from the closed end of the column 40 and surrounds a bubble or spirit level 52.

A centrally bored plate 54, having a depending central flange 56, coaxially surrounds the column flange 50. The upper surface of the plate 54 is provided with a center line 58 and a plurality of spaced-apart lines 60 perpendicular to the center line. A movable weight indicator 62, substantially half cylindrical in general configuration, flatly contacts the upper surface of the plate 54. The weight indicator 62 is provided with a recess 64 so that the level 52 may be seen therethrough when the indicator 62 is centrally positioned on the plate 54.

A wheel supporting disk 66, having a central aperture 68, surrounds the column 40 and contacts the outer tapered wall 42 for supporting a wheel 70 to be balanced. The disk 66 is provided with a plurality of upstanding conical-shaped lugs or pins 72 which are cooperatively received by the lug bolt holes of the respective wheel 70.

Operation

In operation the plate 54 and weight indicator 62 are removed. A wheel supporting disk 66 is placed on the column 40. A wheel 70 to be balanced is placed on the disk 66. The column and wheel are supported by the column flange 46 contacting the base cap 20. The plate 54 is placed on the top of the column and the handle 32 is manually moved downwardly and laterally against the spring 34 to lock the handle 32 under the lip 35 so that the column 40 is supported by the upper pointed end of the shaft 38. The plate 54 is rotated so that the center line 58 is in line with the direction of unbalance of the wheel as indicated by the bubble level 52. The weight indicator 62 is then positioned on the upper surface of the plate 54 with its longitudinal axis normal to the center line 58. The indicator 62 is then gradually moved toward the weight indicating lines 60 until the bubble of the level is centered indicating a balanced condition for the wheel. Indicia, not shown, but marked on the upper surface of the plate 54 in conjunction with the weight indicating lines 60, indicate the total weight necessary to achieve the wheel balance. This total weight is divided by two and two wheel weights, not shown, equaling the total weight necessary are placed on the rim of the wheel at the position of the arrows 80 which are spaced 120° apart with respect to each other and with respect to the center line 58.

Obviously the invention is susceptible to some change or alteration without defeating its practicability, and I therefore do not wish to be confined to the preferred embodiment shown in the drawings and described herein, further than I am limited by the scope of the appended claim.

I claim:

A wheel balancing device, comprising: three side members integrally joined in upwardly converging relation to form a triangular shaped stand; a centrally apertured cap overlying the upper end of said stand; a housing connected in depending relation to the lower surface of said cap around the aperture therein and within said stand, said housing having opposing walls; a vertically disposed rod positioned within said housing and having a pointed end portion projecting upwardly above said cap; a handle projecting into said housing through one said side member, said handle being pivotally connected, intermediate its ends, with said opposing walls of said housing and pivotally connected at its innermost end with said rod for vertical movement of the latter in response to vertical movement of said handle; a vertically disposed hollow column having an upwardly converging outer wall surface and having its lower end portion open and freely surrounding said rod, said column having a balance point in the form of a conical recess in its upper end portion on its longitudinal axis, the pointed end of said rod being of smaller diameter than the diameter of the conical recess; a bubble level coaxially mounted on the upper end of said column; a wheel supporting flange having a central aperture surrounding and removably engageable with the outer converging wall surface of the column; a plurality of upstanding lug bolt hole engaging pins secured to said wheel supporting flange; a centrally bored plate coaxially supported by the upper end of said column, said plate having a center line scribed on the upper surface thereof and a plurality of weight indicating scales extending transversely across the center line intermediate its ends, and having a pair of radial lines scribed thereon spaced 120° apart on respective sides of that portion of the center line intersected by the weight indicating scales; and a balance weight indicator slidably positioned transveresly of the center line on the upper surface of said plate, said weight indicator comprising a semicylindrical member having a lateral recess medially its ends defining spaced-apart aligned edge portions at one side of said weight indicator for selective cooperation with the weight indicating scales.

References Cited

UNITED STATES PATENTS

| | | | |
|---|---|---|---|
| 2,176,269 | 10/1939 | Morse | 73—482 |
| 2,589,456 | 3/1952 | Tinkham | 73—483 |
| 2,592,804 | 4/1952 | Holl | 73—484 |
| 2,718,781 | 9/1955 | Kiebert | 73—484 |
| 2,979,958 | 4/1961 | Kennedy | 73—483 |
| 3,152,483 | 10/1964 | Hemmeter | 73—484 |
| 3,159,035 | 12/1964 | Mueller et al. | 73—483 |
| 3,203,255 | 8/1965 | Rexroat | 73—484 |

JAMES J. GILL, *Primary Examiner.*